United States Patent [19]

Foster et al.

[11] Patent Number: 5,725,668
[45] Date of Patent: Mar. 10, 1998

[54] EXPANDABLE FLUID TREATMENT DEVICE FOR TUBLAR SURFACE TREATMENTS

[75] Inventors: Elizabeth F. Foster, Friendsville, Pa.; Jeffrey C. Hedrick, Park Ridge, N.J.; Stephen L. Tisdale, Endwell; Alfred Viehbeck, Fishkill, both of N.Y.

[73] Assignee: International Business Machines Corporation, Armonk, N.Y.

[21] Appl. No.: 770,067

[22] Filed: Dec. 19, 1996

Related U.S. Application Data

[63] Continuation of Ser. No. 523,883, Sep. 6, 1995, abandoned.

[51] Int. Cl.$^6$ ..................................................... B05C 1/04
[52] U.S. Cl. .......................... 118/411; 118/314; 118/315; 118/325; 118/419; 118/DIG. 11
[58] Field of Search ...................... 118/63, 313, 314, 118/315, 325, 411, 419, DIG. 11, DIG. 22; 68/181 R; 134/122 R, 64 R; 266/111, 112, 113

[56] References Cited

U.S. PATENT DOCUMENTS

| | | |
|---|---|---|
| 4,142,010 | 2/1979 | Pipkin et al. . |
| 4,174,261 | 11/1979 | Pellegrino . |
| 4,203,257 | 5/1980 | Jamison et al. . |
| 4,299,186 | 11/1981 | Pipkin et al. . |
| 4,387,124 | 6/1983 | Pipkin et al. . |
| 4,749,059 | 6/1988 | Jonnes et al. .................. 184/15.1 |
| 4,836,133 | 6/1989 | Wohrle et al. . |
| 5,063,951 | 11/1991 | Bard et al. ....................... 134/64 R |
| 5,192,394 | 3/1993 | Bard et al. . |
| 5,207,833 | 5/1993 | Hart .................................. 118/307 |
| 5,289,639 | 3/1994 | Bard et al. . |
| 5,566,694 | 10/1996 | Pugh et al. ...................... 134/64 R |
| 5,614,265 | 3/1997 | Chaudhry et al. .............. 427/430.1 |

*Primary Examiner*—Laura Edwards
*Assistant Examiner*—Steven B. Leavitt
*Attorney, Agent, or Firm*—Daniel P. Morris

[57] ABSTRACT

An apparatus for applying a fluid to an outer surface of an elongated work piece having a longitudinal axis and a cross sectional shape, perpendicular to the longitudinal axis. The apparatus has a head member having an interior wall cross sectional shape adapted for receiving the cross sectional shape of the elongated work piece. The interior cross sectional shape defines an interior wall of the head member. The head member has an input end and an output end. The interior wall has means for applying the fluid to a surface of said elongated member. The head member has preferable a first part and a second part which are joined by an expandable member. The means for applying said fluid comprises a plurality of jets for directing said fluid on said surface and a plurality of output parts for recovering said fluid for applying a fluid to an outer surface, said elongated work piece having a longitudinal axis and a cross sectional shape, perpendicular to said longitudinal axis, comprising:

a head member having an interior wall cross sectional shape adapted for receiving said cross sectional shape of said elongated work piece;

said interior cross sectional shape defining an interior wall of said head member;

said head member has an input end and an output end;

said interior wall has means for applying said fluid to a surface of said elongated member.

19 Claims, 2 Drawing Sheets

EXPANDABLE FLUID TREATMENT DEVICE FOR TUBLAR SURFACE TREATMENTS

This is a continuation of application Ser. No. 08/523,883, filed Sep. 6, 1995 now abandoned.

CROSS REFERENCE TO RELATED APPLICATIONS

U.S. application Ser. No. 08/523,969 filed on the same day herewith, entitled "Fluid Jet Impregnating and Coating Device With Thickness Control Capability" to E. Foster et al., is incorporated herein by reference.

U.S. application Ser. No. 08/523,881 filed on the same day herewith, entitled "Jet Impregnation" to E. Foster et al., is incorporated herein by reference.

TECHNICAL FIELD

The invention describes a fluid treatment (head) device capable of treating a tubular substrate in a continuous manner.

BACKGROUND OF THE INVENTION

The application of a fluid to a substrate to treat the surface (i.e., etching, coating, plating, cleaning, rinsing, chemically reacting, etc.) is utilized in the manufacture of a variety of articles. These fluid treatments are typically carried out by using dip tanks or spray nozzles. These techniques are effective in coating or treating (i.e., cleaning, etching, rinsing, etc.) the substrate; however, there are typically significant amounts of chemical contaminants (e.g., pollutants) released into the environment during processing. Moreover, many of these processes are inefficient and result in a substantial amount of chemical waste which must be recovered and disposed of properly. Spray nozzles, for instance, are disadvantageous because, among other reasons, they serve to atomize a fluid, resulting in the evaporation of the fluid and loss of solvent to the environment. As a consequence, undesirable chemical emissions are exacerbated and re-use of the fluid is precluded, both of which are uneconomical. Dip tanks, while useful, are disadvantageous due to poor mass transfer or diffusion which is often too slow a process to be economical. Furthermore, when dip tanks are utilized for processes such as rinsing, problems arise when the dip tank becomes laden with the material to be removed from the substrate.

Various devices designed for treatment of substrates and similar articles are described in U.S. Pat. No. 4,142,010 (D. J. Pipkin et al.), U.S. Pat. No. 4,299,186 (D J. Pipkin et al.), U.S. Pat. No. 4,387,124 (D. J. Pipkin et al.), U.S. Pat. No. 4,836,133 (A. Wohrle et al.), U.S. Pat. No. 5,289,639 (Bard et al.), U.S. Pat. No. 5,192,394 (Bard et al.), and U.S. Pat. No. 5,063,951 (Bard et al.). The devices referenced in the aforementioned patents, however, do not possess the unique features of the fluid jet treatment/coating device described herein. It is believed that a fluid treatment device possessing the advantageous features cited herein and otherwise discernible from the teachings provided below constitutes a significant advancement in the art.

SUMMARY OF THE INVENTION

The primary object of the present invention is to enhance the art of fluid impregnation devices.

It is another object of the invention to provide a fluid treatment device capable of applying fluids to a substrate with relative precision and in a facile manner.

It is another object of the invention to provide a fluid treatment device capable of coating a substrate with high precision and accuracy.

It is still another object of the present invention to provide such a device which operates in a relatively simplistic manner and which can be produced relatively inexpensively.

In accordance with one aspect of the invention, there is defined a device for applying fluid to a substrate, the device including at least one head member which includes therein means for directing a first fluid at an established first pressure against the substrate and means for directing a second fluid at an established second pressure (at a location of fluid intersection) against the substrate such that the first fluid impingement on the substrate is limited to a predetermined location.

A broad aspect of the present invention is an apparatus for applying a fluid to an outer surface of an elongated work piece, the elongated work piece having a longitudinal axis and a cross sectional shape perpendicular to said longitudinal axis. The apparatus has a head member having an interior sectional shape adapted for receiving the cross sectional shape of the elongated work piece; the interior corps sectional shape defining an interior wall of the head member; the head member has an input end and an output end; and the interior wall has means for applying the fluid to a surface of the elongated member.

In a more particular aspect of the apparatus, according to the present invention, wherein the means for applying the fluid comprises a plurality jets for applying the fluid to the surface of the work piece and a plurality of output ports for recovering the fluid applied to surface.

In another more particular aspect of the apparatus, according to the present invention, the head member has a first part and a second part which are joined by an expandable member permitting movement of the first and second parts with respect to each other.

An additional aspect of the invention includes a fluid treatment device consisting of two head members with at least one row, preferably an array of several rows, of fluid jet injectors. A substrate is transported between the parallel head members in a direction which is substantially parallel to an axis associated with the apparatus surface, extending from the entrance edge to the exit edge, with the row(s) of fluid jet injectors aligned transversely to this axis. In one case the substrate, during its transport, is exposed to a fluid (i.e., resin/polymer solution or hot melt) expelled from the fluid jet injectors with substantially equal pressures. As described herein, the present invention is designed for applying a fluid to a substrate in such a manner so as to direct such fluid to a predetermined and precisely defined thickness on the substrate. Accordingly, the term fluid as used herein to describe the capability of the invention is meant to include both liquids (e.g., a solvent solution or hot melt of a resin or polymer, as well as aqueous solutions and suspensions, etc.) and gases (e.g., nitrogen, air, etc.). Further, the term substrate, as used herein, is meant to include any tubular structure such as tubings, wires, cables, single or bundle of fibers, etc. composed of organics (e.g., polymers, plastics), inorganics (e.g., ceramics), metals, carbon, glass, mineral, etc.

The invention utilizes a head member (e.g, chamber) wherein two fluids are directed such that one functions to substantially limit the impingement of the other to a defined and predetermined location on the substrate. The invention thus utilizes two fluids at two pressures to provide relatively precise fluid application. In addition, the invention provides a means to achieve precise control of thickness of the coating of impregnated fluid. Accordingly, since such fluid control is realized, it is possible to limit exposure of the fluid to the external environment thus substantially limiting release of chemical contaminants (e.g., pollutants). This is advantageous from both an environmental perspective and also in protecting operators from potentially harmful chemical exposure. Furthermore, precise fluid control allows for processing using smaller volumes and recycling of said fluids, thus reducing chemical waste and the need to dispose of said chemical waste, thus reducing processing costs.

BRIEF DESCRIPTION OF THE DRAWINGS

For a better understanding of the present invention, together with other and further objects, advantages and capabilities thereof, reference is made to the following disclosure and appended claims in connection with the following drawings of which:

DETAILED DESCRIPTION OF THE INVENTION

Figure 1:
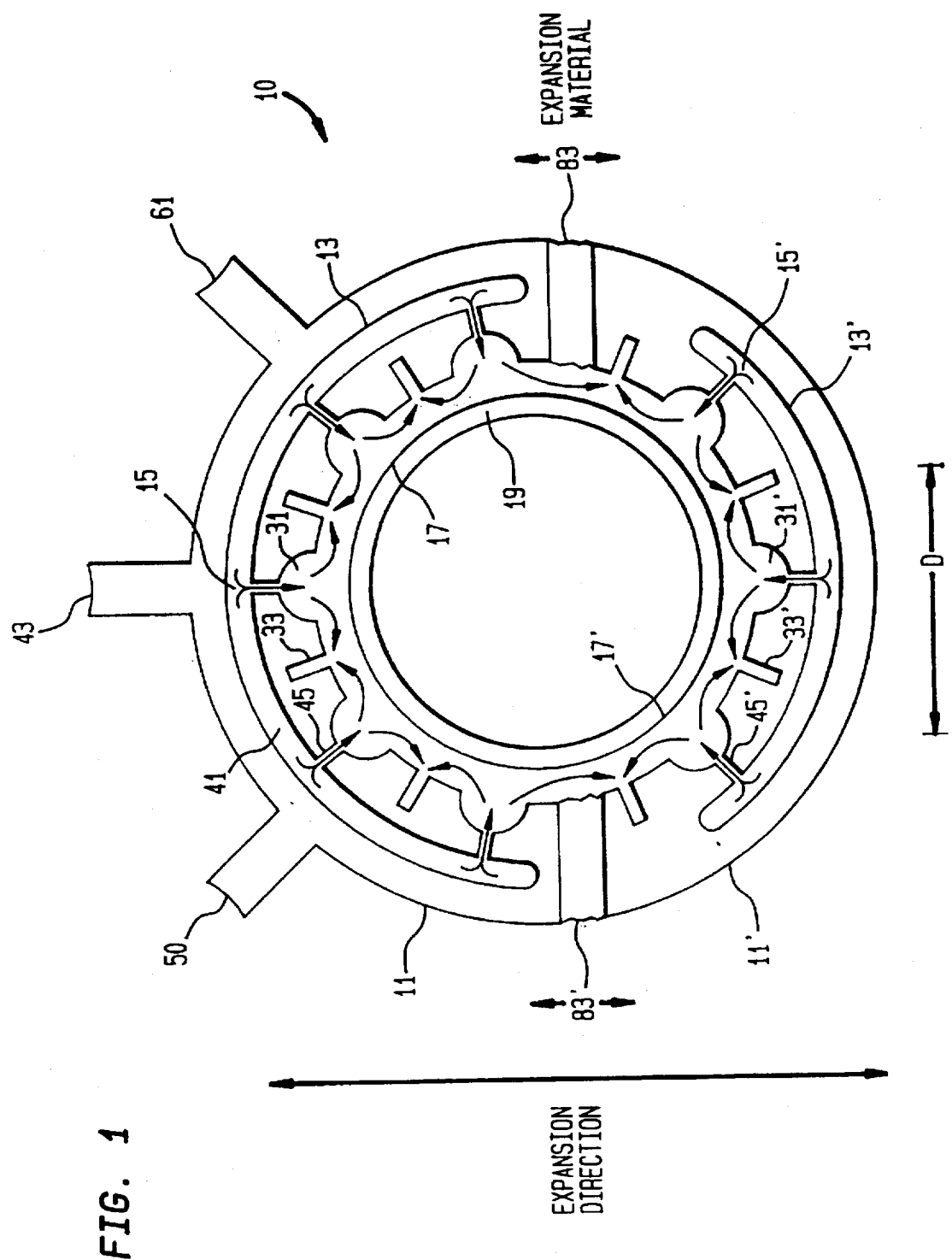
FIG. 1 is a cross section perspective view of an expandable fluid head treatment/coating device for tubular structures in accordance with one aspect of the invention.
Figure 2:
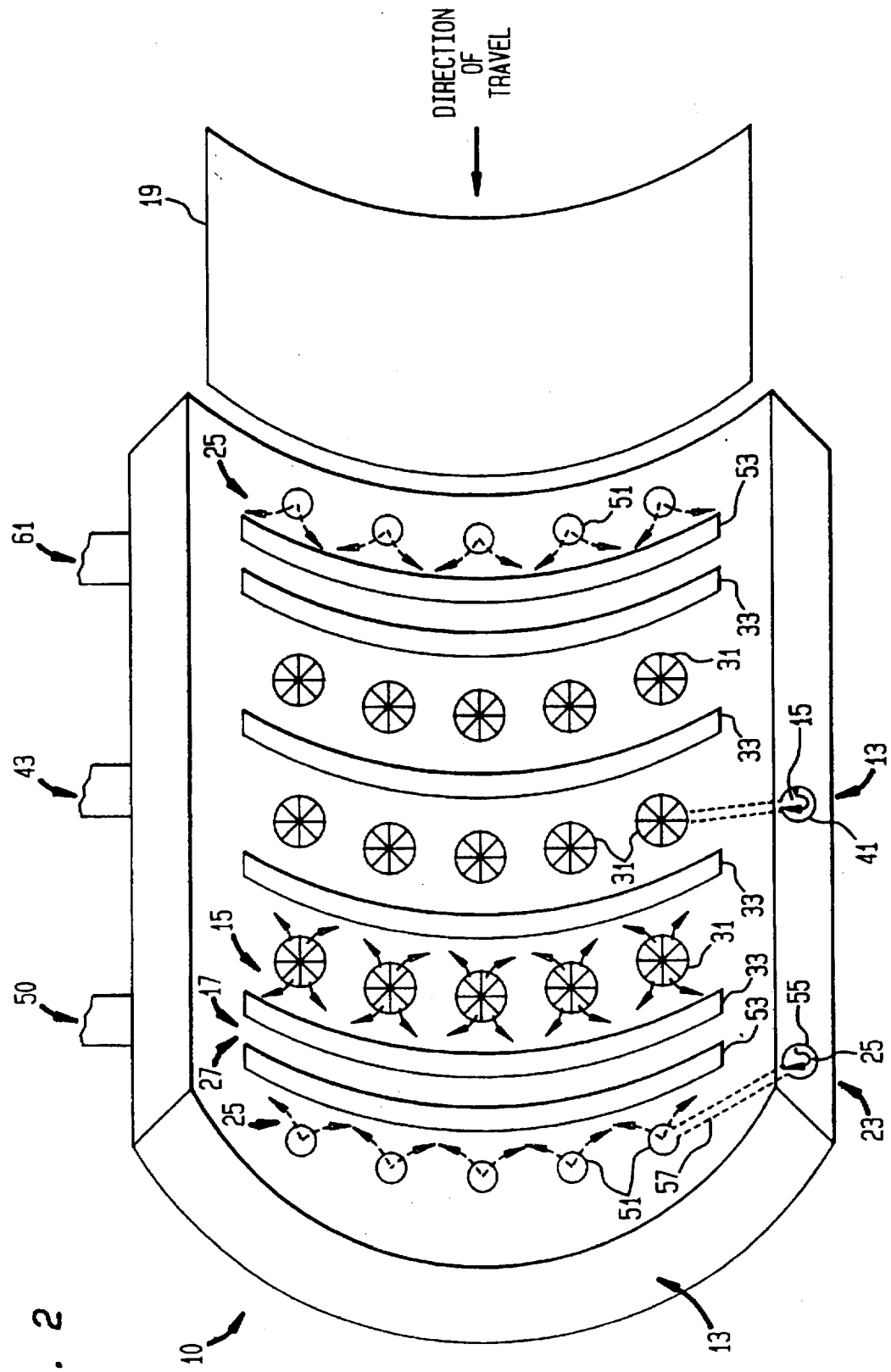
FIG. 2 is a longitudinal cross section of a tubular fluid head device in accordance with the present invention.

In FIGS. 1 and 2, there is shown a coating/surface treatment device 10 in accordance with a preferred embodiment of the invention. As understood from the following, the invention is capable of applying fluids to a substrate in a continuous manner while effecting relatively high mass transfer rates to a desired area thereon and while substantially limiting the interaction with the external atmosphere. Most significantly, the device as taught herein insures relatively precise impingement of the fluid to a selected area of the substrate, such precision deemed essential in the treatment of various products such as tubings, wires, cables, etc. Accordingly, the invention as defined herein is particularly adapted for use in such treatment and particularly wherein such treatment involves the use of hazardous chemicals as the primary treatment fluid. The invention is not limited to dissolved chemical solutions, however, in that other fluids may be readily utilized using the present invention such as polymer melts or polymer solutions. This invention is thus considered to represent a significant advancement in the art of surface treatment and coating devices.

Device 10 comprises at least one head member 11 which includes therein means 13 for directing a first fluid 15 (represented by the solid arrows in FIG. 1) of an established first pressure against a first, predetermined location 17 located on a substrate 19 positioned within device 10. In one embodiment of the invention, first fluid 15 is an alkali metal salt solution in an aprotic solvent and is applied against a location 17 on a polymer substrate 19. The alkali metal salt is utilized to treat the polymer substrate 19 for improving bondability and adhesion.

As stated, device 10 is capable of treating other types of substrate materials, including organics (e.g., polymers, plastics, polyimides), inorganics (e.g., ceramics), metals, glass, carbon, etc. or any combination thereof. Furthermore, the substrate can be in the form of a tubing, cable, solid wire, single filament fiber toe, etc. Thus, the invention is not limited to a particular type of fluid or substrate.

In the above example, the substrate 19 typically possesses an overall diameter (dimension D in FIG. 1) preferably of about 48 inches. Substrates having wall thicknesses 21, preferably ranging from 0.005 inch to about 5.0 inches, may be successfully treated using the invention. As shown in FIG. 2, head member 11 further includes means 23 for directing a second fluid 25 (represented by the dashed arrows in FIG. 2) of an established second pressure substantially equal to or greater than the pressure of the first fluid 15, this second fluid 25 being directed to a predetermined location 27 on substrate 19 adjacent the first fluid location 17 which receives application of fluid 15.

As seen in FIG. 2, the means for applying second fluid 25 directs this fluid at opposite ends of the substrate's first location. Such application of the second fluid serves to substantially limit application of first fluid 15 to impingement substantially only on location 17, and at the approximate central area of the device 10.

In one example of the invention (that using the aforementioned alkali metal salt solution), nitrogen is the preferred fluid for the second fluid 25. As stated, the second fluid is at a pressure equal to or greater than the first fluid pressure to thus assure impingement of the first fluid to the desired location.

Device 10 is capable of treating substrates located therein wherein the substrate is either moving at an established rate or established in a fixed position relative to the device's structure. In the situation wherein substrate 19 is moving, the first fluid 15 will strike the surface adjacent head 11 substantially along the entirety thereof. However, the invention assures that such fluid application will only occur for a predetermined time to the location 17 illustrated in FIG. 2, thus assuring that the desired time periods for exposure to the particular fluids being applied will occur. Such time periods may of course be readily adjusted by corresponding adjustment to the substrate's rate of movement.

Preferably, device 10 has two head members why the second head member being represented by the numeral 11', as shown in Figure. Further, head 11' may be of identical configuration to that of the upper head 11 shown in FIG. 2. Thus, similar numerals will be used to identify similar structures. However, this is not to limit the invention, in that the second head may be of a different internal configuration while still achieving the proposed desire, that being to provide two fluid heads to provide precise fluid impingement is also provided by the lower head member (11'). The second head member also includes means 13' and 23' for directing fluids 15' and 25', respectively, corresponding to 13 and 23 for directing fluids 15 and 25 (FIG. 2). This arrangement (two heads) is particularly desired to enhance fluid penetration and "wetting" of the substrate. Means 23', however still remains under positive pressure directing fluid 25' in the direction shown by Fluid 25 in FIG. 2. This is advantageous to maintain the substrate at a spaced location (as shown in FIG. 2) and to substantially limit application of fluid 15 to impingement substantially only on location 17, and at the approximate central area of device 10.

Means 13 for directing first fluid 15 comprises at least one inlet port 31 positioned within head member 11 and at least one outlet port 33 located relative to the inlet port. As seen in FIG. 2, means 13 includes curved linear side walls, said configurations deemed most appropriate for effective flow of fluids such as resins or the like in order to direct said fluids onto the adjacent substrate in the most effective manner. Significantly, the respective outlet ports 33 need number only four,(FIG. 1 shows more than 4) each one being located adjacent and with respect to a singular row of inlet ports 31. As seen in FIG. 2, each outlet port 33 is of a elongated configuration and thus constitutes a groove or slot within the head members upper surface. It has also been determined that linear (straight) sidewalls for these outlet ports provide the most effective means of fluid escape at this location, although these sidewalls may possess other configurations (e.g., curved linear, tapered) and still provide effective fluid escape.

The first fluid 15 is preferably supplied to a common chamber 41 located in the head member from a common inlet tube 43 or the like connected to this common chamber. Fluid 15 is further passed through narrow passages 45 between the ports and common chamber to each of the respective curved linear inlet ports. Withdrawal of fluid 15 after application to substrate 19 is accomplished by passage of this fluid completely through the elongated grooves 33, which are preferably connected to a common duct (not shown) or the like whereupon these pass through an outlet tube 50 or the like. Tube 50 may in turn be connected to a recirculation means including a degassing mechanism, a pump and a viscosity controller. It is of course also possible to provide appropriate fluid treatments (e.g., filters, etc.) as part of this recirculation means.

It is understood that when two head members are utilized, the corresponding inlet and outlet ports for the remaining head member (e.g., 11') will be similarly connected to common outlet tubing, such as 43 and 50 as shown in FIG. 1.

As stated, fluid treatment device 10 maintains the treated substrate at the above cited spaced location from the respective head members during fluid application. This relatively narrow gap thus formed between product and the head member, coupled with high fluid rates of flow, in turn thus results in relatively high mass transfer and enhanced coating/surface treatment rates for the invention. Understandably, the invention is thus readily adaptable to mass production techniques. Significantly, the device as described above thus assures capture of the first fluids as utilized herein to thus enable recycling thereof if desired. Such recapture serves to reduce the cost of manufacture associated with using the invention. Equally significant, because the respective second fluids serve to assist in such capture, any potentially harmful materials (e.g., pollutants) are thus contained with in the system.

It is understood that the maintaining of substrate 19 at the spaced distance from the head member's external surface results in a fluid bearing being formed along the surface, the substrate thus riding on said bearing during location within (including movement through) device 10 during fluid application.

Each of the means 23 and 23' for directing second fluid 25 and 25' comprises at least one inlet port 51 and 51' and a corresponding outlet port 53 and 53' located relative thereto. A plurality (e.g., ten) of such inlet ports 51 are utilized for each head member, these inlet ports being arranged in two singular rows (e.g., of five each). The second fluid 25 is supplied to each of these rows of inlet ports through a common channel 55 (or 55' in the case of head member 11'), which fluid then passes upwardly or downwardly within the head through narrow passages 57 and 57' to the respective inlet ports. Each inlet port, as shown, includes substantially linear (straight) sidewalls, as do each of the corresponding outlet ports 53. As shown in FIG. 1, these outlet ports are preferably in the shape of an elongated channel of substantially similar configuration (excluding the lower surface thereof) to the adjacent outlet ports 33 for means 13. Thus, a total of only two such outlet ports 53 (or channels) for the second means 23 is provided within each head member. Each of the common inlet chamber 55 is in turn coupled to a common inlet tube 61 (FIG. 1), which tube is in turn connected to the suitable source (e.g., pump). Each of the outlet channels 53 are in turn preferably connected to a exhaust tube (not shown) or the like in order to achieve effective venting of the second fluid (nitrogen).

As shown in FIG. 2, the locations of the intersection between the respective first and second fluids represent the external periphery for the first location to which the first fluid is applied to substrate 19. When using the fluids, pressures and port configurations cited above, the resulting fluid impingement along these intersection boundaries is of extremely fine resolution. That is, the line of demarcation between both fluids is clearly and precisely defined. Such precision is considered essential in the manufacture of structures such as medical device tubing, etc. and represents one of the highly advantageous features of the invention. Device 10 further includes a common manifold located adjacent the respective head members for assisting in receiving and withdrawing the fluids used in device 10. This common manifold preferably includes a common, longitudinal groove or the like to interconnect the described outlet ports 53. Additionally, the common manifold further includes a plurality in inlet ports which are in turn coupled to the respective head member (particularly to the common inlet chambers 55 thereof). Additional manifold members may be utilized in the invention to assist in fluid intake and withdrawal. For example, a second manifold may be coupled to either or both of the respective head members 11 and 11'.

In FIG. 1, a relative displacement of the two opposed head members 11 and 11' can be seen. Each of the head member is shown in its original position prior to fluid application. Substrate 19 is shown between both head members. Although a slight spacing is indicated in FIG. 1, it is understood that the substrate may in fact contact both of the adjacent external head surfaces prior to fluid application. As further shown in FIG. 1, each of the head members is connected (e.g., using screws) to a respective one of the adjacent manifold. Each of these head members is in turn mechanically connected to the other, opposing head member by a pair of expandable hinge members 83 and 83', comprised of a chemical and solvent resistant elastomeric material such as, for example, butyl rubber, nitrile rubber, or natural rubber.

The expandable hinge members are attached to the head members by means of a chemical and solvent resistant adhesive such as, for example, a bisphenol A-based epoxy adhesive. The expandable hinge member can be mechanically reinforced by an internal metal structure which itself can be mechanically attached to the head members.

Thus, it can be seen in FIG. 1 that when fluid is applied, relative movement of both head members 11 and 11' will occur. In FIG. 1, head member 11' moves downwardly while head member 11 moves upwardly relative to the common substrate, which substrate is now located at the aforementioned spaced location from each of the respective head members. It is noted that each of the head members maintains its fixed position relative to the manifold connected thereto, but each such head member is able to move in the opposing manner as shown by virtue of the respective hinge members 83 and 83' slightly expanding in the manner indicated in FIG. 1. The direction of travel of substrate 19 can be either in the vertical or horizontal direction through head members 11 and 11'.

Thus, there has been shown and described a fluid treatment device possessing the several highly advantageous features cited above. As stated, the device is readily adaptable for use with a variety of fluids, including thermosetting resin solutions and hot melts, non-aqueous solutions, aqueous solutions, acrylic resins, liquid photoresists, air, nitrogen, etc. The device as described is of relatively simple construction and can thus be produced at relatively minor costs. Further, the device as described is readily adaptable for use in mass production, thereby even further reducing the cost of manufacture associated therewith.

While there have been shown and described what are at present considered the preferred embodiments of the invention, it will be obvious to those skilled in the art that various changes and modifications may be made therein without departing from the scope of the invention as defined by the appended claims.

We claim:

1. An apparatus for applying a fluid to an outer surface of an elongated work piece, said elongated work piece having a longitudinal axis and a cross sectional shape perpendicular to said longitudinal axis, comprising:

a head member having an interior wall with a cross sectional shape configured for substantially conformance with said cross sectional shape of said elongated work piece;

said interior cross sectional shape defining said interior wall of said head member, said head member has an input end and an output end;

said interior wall containing a recessed means for applying said fluid to a surface of said elongated member which recessed means comprises a plurality recessed jets for applying said fluid to said outer surface and a plurality of recessed output ports for recovering said fluid applied to said outer surface to restrict loss of the fluid from the head.

2. An apparatus according to claim 1, wherein said cross sectional shape is selected from the group consisting of curvalinear shape and a polygonal shape.

3. An apparatus according to claim 2, wherein said curvalinear shape is selected from the group consisting of a circle, an ellipse and an oval.

4. An apparatus according to claim 1, wherein said jets and said output ports are uniformly distributed about said interior wall.

5. An apparatus according to claim 1, wherein said surface of said elongated member is spaced apart from said interior wall thereby permitting a fluid leaving heavy foam between said surface and said interior wall on which said work piece slides.

6. An apparatus according to claim 1, wherein said head member has a first plurality of fluid injectors and said second head member has a second plurality of fluid injectors.

7. An apparatus according to claim 6, wherein said first plurality of fluid injectors directs said fluid towards said work piece and wherein said second plurality of fluid injectors directs a second fluid that establishes a fluid barrier that diverts the first mentioned fluid away from portions of said work piece.

8. An apparatus according to claim 1, wherein said head member comprises a first head member and a second head member each of which has a first edge and a second edge, said first edge of said second head member by a first joining means, said second edge of said first head member being joined to said second edge of said second head member by a second joining means.

9. An apparatus according to claim 8, wherein said first and said second joining means is an expandable member.

10. An apparatus according to claim 1 wherein the interior wall of said head member is sized to be closely juxtapositioned to said exterior surface of the work piece so that said fluid acts as a bearing between the work piece and the head member.

11. An apparatus according to claim 10, wherein said head member comprises a first and second part which are joined by an expandable member.

12. An apparatus according to claim 10, further including a means for feeding said work piece into said head member.

13. An apparatus according to claim 12, further including at said input end and said output end means for containing said fluid within said head member.

14. An apparatus according to claim 13, wherein said means for containing said fluid within said head member is an air stream.

15. An apparatus according to claim 10 wherein said head member is segmented and the segments joined by expandable members that permit expansion of the head member as fluid enters the space between the interior wall of the head member and the exterior surface of the work piece.

16. The apparatus according to claim 10 wherein said interior wall is without obstructions that intrude into the space between the interior wall and the work piece.

17. An apparatus for applying fluid to an outer surface of an elongated work piece having a longitudinal axis and a cross sectional shape, perpendicular to the longitudinal axis comprising:

a head member having an interior wall cross sectional shape substantially conforming to the shape of the cross sectional shape of said elongated work piece;

said interior cross sectional shape defining an interior wall of said head member;

said head member has an input end and an output end;

said interior wall has means for applying a first and a second fluid to an exterior surface of said elongated work piece said means including a first set of recessed jets for directing the first fluid against a portion of said exterior surface and a first set of recessed output ports for extracting the first liquid from between the work piece and the head member and including a second set of recessed jets for directing the second fluid against a different portion of said exterior surface and a second set of recessed output ports for extracting the second fluid from between the work piece and the head member so as to establish a fluid barrier of said second fluid to substantially isolate the different portion of the exterior surface from the first liquid.

18. An apparatus according to claim 17, further including a means for feeding said elongated work piece into said head member.

19. An apparatus according to claim 17 wherein said head member is segmented with the first set of jets on one segment and the second set of jets on another segment which segments are joined by expandable member that permit relative movement of said segments with respect to one another along the axis of the elongated work piece.

* * * * *